United States Patent
Nguyen et al.

(10) Patent No.: US 8,803,495 B2
(45) Date of Patent: Aug. 12, 2014

(54) PRE-BIAS CONTROL FOR SWITCHED MODE POWER SUPPLIES

(75) Inventors: Baoson Nguyen, Garland, TX (US); Rex M. Teggatz, Sachse, TX (US); Li Li, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 356 days.

(21) Appl. No.: 12/846,370

(22) Filed: Jul. 29, 2010

(65) Prior Publication Data
US 2012/0026762 A1 Feb. 2, 2012

(51) Int. Cl.
*H02M 1/36* (2007.01)

(52) U.S. Cl.
USPC .......................................................... 323/282

(58) Field of Classification Search
USPC ......... 323/222–224, 259, 265, 266, 271, 274, 323/277, 280–282, 284, 285, 290
See application file for complete search history.

(56) References Cited

U.S. PATENT DOCUMENTS

| | | | |
|---|---|---|---|
| 6,548,991 B1 * | 4/2003 | Maksimovic et al. | 323/224 |
| 6,958,592 B2 * | 10/2005 | Chapuis | 323/246 |
| 7,362,595 B2 * | 4/2008 | Noma | 363/59 |
| 8,004,263 B2 * | 8/2011 | Hirata et al. | 323/285 |

* cited by examiner

*Primary Examiner* — Adolf Berhane
*Assistant Examiner* — Yemane Mehari
(74) *Attorney, Agent, or Firm* — William B. Kempler; Frederick J. Telecky, Jr.

(57) ABSTRACT

An embodiment of the invention provides a method of reducing a drop in voltage on a pre-biased output of a DC-DC step-down switching converter. A high side switch is activated to conduct a first current to the pre-biased output. After the high side switch is activated, a low side switch is activated to draw a second current from the pre-biased output such that the magnitude of the first current is greater than the magnitude of the second current for at least a portion of a time period T1. After the time period T1 ends, the magnitudes of the first and second currents are changed to maintain a predetermined voltage on the pre-biased output.

15 Claims, 5 Drawing Sheets

PRE-BIAS CONTROL FOR SWITCHED MODE POWER SUPPLIES

BACKGROUND

DC (Direct Current)-DC converters may be found in many electronic devices. For example, DC-DC converters are often found in PDAs (Personal Digital Assistant), cellular phones and laptop computers. These electronic devices often contain several sub-circuits with different voltage level requirements from that supplied by a battery or an external supply. A DC-DC converter converts a source of direct current from one voltage level to another voltage level in order to meet the voltage levels required by sub-circuits.

One method of providing DC-DC conversion is through the use of a linear regulator. However, a linear regulator may dissipate too much heat for devices such as laptop computers and cellular phones.

DC-DC switching converters convert one DC voltage level to another by storing the input energy temporarily and then releasing that energy to the output at a different voltage. The storage may be in either magnetic field storage components (inductors, transformers) or electric field storage components (capacitors) or a combination of both. These conversion methods are more power efficient (often 75% to 98%) than a linear regulator for example. This efficiency is beneficial to increasing the running time of battery operated devices.

A DC-DC step-down converter converts a higher voltage to a lower voltage. For example, on an IC (integrated circuit) a 3.6 volt power supply and a 1.8 volt power supply may be needed to provide power to circuits on the IC. In this example, a DC-DC step-down switching converter may be used to convert the 3.6 voltage reference to a 1.8 voltage reference.

When a DC-DC step-down switching converter is initiated, the voltage on the output of the DC-DC step-down switching converter may not be zero. Rather, the output of the DC-DC step-down switching converter may be pre-biased to voltage greater than zero. The output of the DC-DC step-down switching converter may have been pre-biased to a voltage greater than zero by another circuit. When a DC-DC step-down switching converter starts with a pre-bias voltage on its output, the voltage on the output may temporarily drop causing problems for the circuits connected to the output.

DETAILED DESCRIPTION

The drawings and description, in general, disclose a method and apparatus for reducing a drop in voltage on a pre-biased output of a DC-DC step-down switching converter. In one embodiment, a HS (high side) switch provides a first current to the pre-biased output of the DC-DC step-down switching converter. After the first HS switch provides the first current to the output of the DC-DC step-down switching converter, a LS (low side) switch begins to draw a second current from the pre-biased output of the DC-DC step-down switching converter for a time period T1.

During at least a portion of time period T1, the magnitude of the first current provided by the HS switch is greater than the second current drawn by the LS switch. Because the magnitude of the first current provided by the HS switch is greater than the second current drawn by the LS switch during at least a portion of the time period T1, a drop in voltage on the output of the DC-DC step-down switching converter is significantly reduced. When the time period T1 ends, the magnitude of the first current and the magnitude of the second current may be changed due to the load attached to the output of the DC-DC step-down switching converter.

Figure 1:
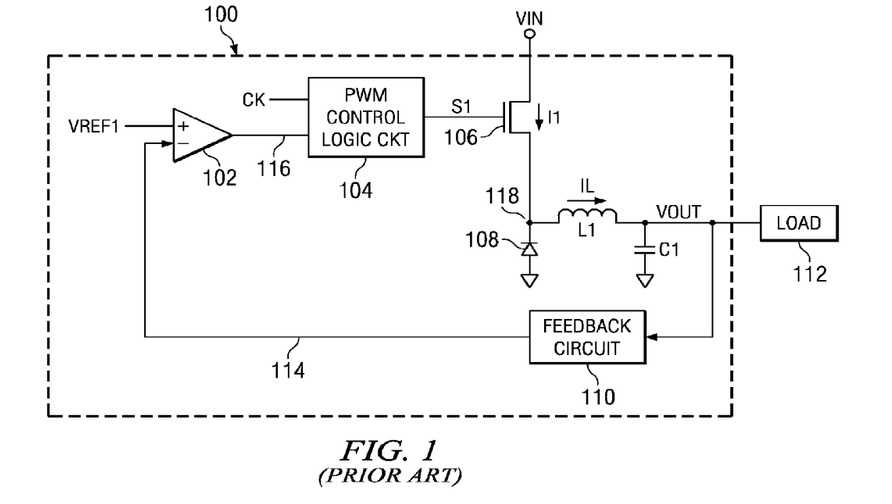
FIG. 1 is a schematic of a non-synchronous DC-DC step-down switching converter. (Prior Art)
Figure 2:
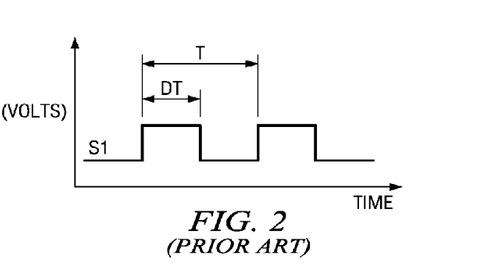
FIG. 2 is a timing diagram of a control signal of a switching device. (Prior Art)

FIG. 1 is a schematic of a non-synchronous DC-DC step-down switching converter 100. FIG. 1 is included to explain the general principles of a non-synchronous DC-DC step-down converter 100. In this schematic, the frequency at which a switch, in this case an NFET (N-type Field-Effect Transistor) 106 is switched is controlled by a signal S1 (shown in FIG. 2). Other switches such as MOSFETs (Metal Oxide Semiconductor Field-Effect Transistor), JFETs (Junction Field-Effect Transistor) and bipolar transistors may be used. The signal S1 shown in FIG. 2 is a pulse-width modulated (PWM) signal. The amount of time, DT that NFET 106 conducts current during a signal S1 period T is determined by a duty cycle D. The duty cycle D may have a value from 0 to 1. The amount of time the NFET 106 does not conduct current is approximately $(1-D)*T$.

In this example of a non-synchronous DC-DC step-down switching converter 100, a voltage VIN is connected to the drain of NFET 106. The source 118 of NFET 106 is connected to inductor L1 and the cathode of diode 108. The inductor L1 is also connected to the capacitor C1, a load 112 and the input of a feedback circuit 110 at VOUT. The output 114 of the feedback circuit 110 is connected to an input of op-amp 102. A DC voltage reference VREF1 is connected to an input of op-amp 102. The output of op-amp 102 is connected to an input 116 of a PWM control logic circuit 104. Clock signal CK is connected to an input of the PWM control logic circuit 104. The output S1 of the PWM control logic circuit 104 controls the switching of NFET 106.

When the gate of NFET 106 is at a logical high value, current I1 is conducted through the NFET 106 and the inductor L1 into the capacitor C1. The inductor L1 and the capacitor C1 filter out high frequency components created on node 118 by the switching NFET 106. By changing the duty cycle D of the clock CK, a predetermined DC voltage VOUT may be provided on capacitor C1 at VOUT. For example, the DC voltage VOUT may be increased by increasing the duty cycle D of the clock CK or the DC voltage VOUT may be decreased by decreasing the duty cycle D of the clock CK.

In order to maintain the DC voltage VOUT at a predetermined steady state value, the DC voltage VOUT is fed back to an input of op-amp 102 through the feedback circuit 110. The PWM control logic circuit continually changes the duty cycle D to maintain the DC voltage on VOUT at a substantially constant value.

The non-synchronous DC-DC step-down switching converter 100 is not as efficient (due to the diode voltage drop) as the synchronous step-down switching converters. However, the non-synchronous DC-DC step-down switching converter 100 avoids the droop on the output voltage VOUT since the low side transistor is not present. The current on the diode 108 can only flow in one direction. The output voltage VOUT on the capacitor C1 can not be discharged by the converter 100 and therefore no droop.

Figure 3:
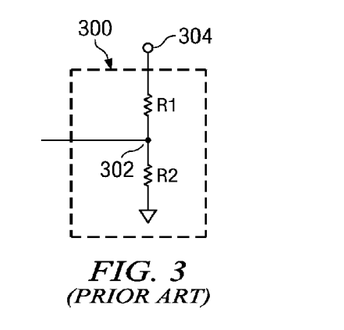
FIG. 3 is a schematic of a feedback circuit. (Prior Art)

FIG. 3 is a schematic of an embodiment of a feedback circuit 300. In this example, two resistors R1 and R2 are connected in series. R1 is connected to node 304 and node 302. R2 is connected to node 302 and ground. Node 304 is connected to the input VOUT of the feedback circuit 110 and node 302 is connected to the output 114 of the feedback circuit 110. Other embodiments of a feedback circuit may be used in the non-synchronous DC-DC step-down switching converter 100 shown in FIG. 1.

Figure 4:
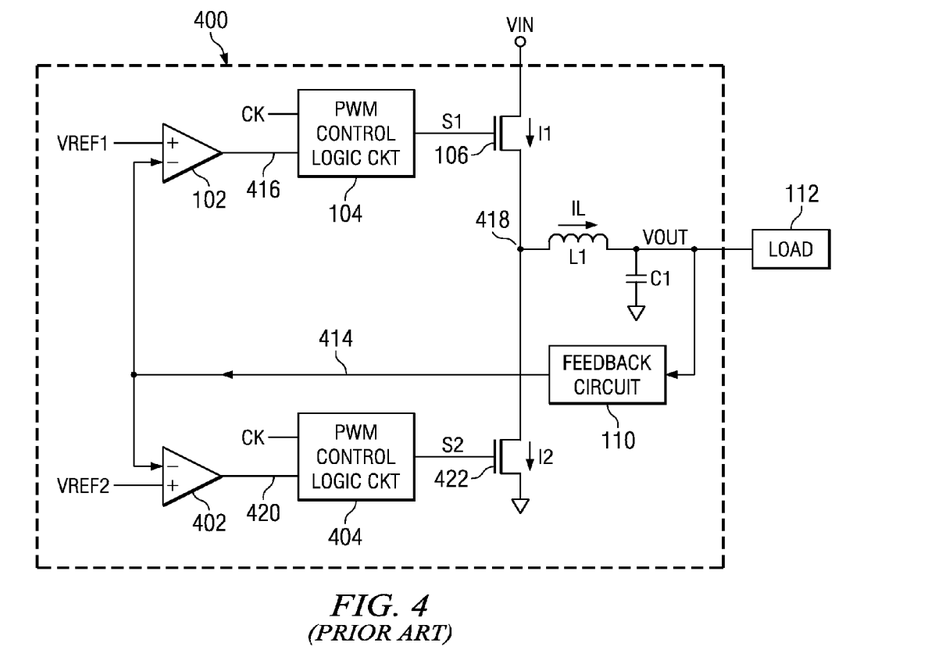
FIG. 4 is an embodiment of a synchronous DC-DC step-down switching converter. (Prior Art)
Figure 5:
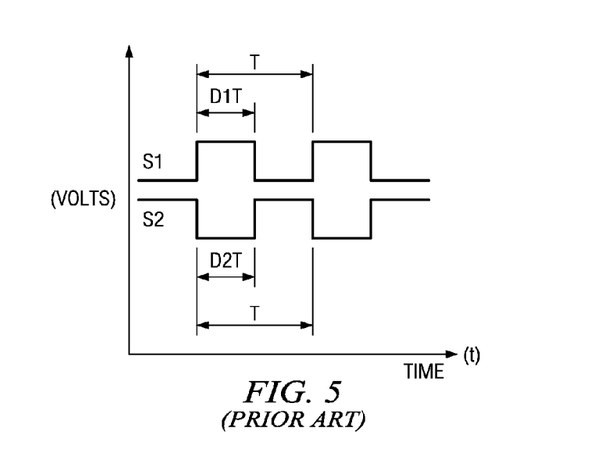
FIG. 5 is a timing diagram of the control signals of the switching devices in a synchronous DC-DC step-down switching converter.

FIG. 4 is a schematic of an embodiment of a synchronous DC-DC step-down switching converter 400. FIG. 4 is included to explain the general principles of a synchronous DC-DC step-down converter. In this schematic, the frequency at which the switches, in this case NFETs 106 and 422, switch is controlled by signals S1 and S2 respectively as shown in FIG. 5. Other switches such as MOSFETs (Metal Oxide Semiconductor Field-Effect Transistor), JFETs (Junction Field-Effect Transistor) and bipolar transistors may be used. The signals S1 and S2 shown in FIG. 5 are pulse-width modulated (PWM) signals.

The amount of time, D1*T, that NFET 106 conducts current during a period T is determined by a duty cycle D1. The duty cycle D1 may have a value from 0 to 1. The amount of time the NFET 106 does not conduct current is approximately (1−D1)*T. The amount of time, D2*T, that NFET 422 conducts current during a period T is determined by a duty cycle D2. The duty cycle D2 may have a value from 0 to 1. The amount of time the NFET 422 does not conduct current is approximately (1−D2)*T. In this example, the time that both switches NFET 106 and NFET 422 are conducting current concurrently is approximately zero.

In this embodiment of a synchronous DC-DC step-down switching converter 400, a voltage VIN is connected to the drain of NFET 106. The source 418 of NFET 106 is connected to inductor IL and the drain of NFET 422. The inductor L1 is also connected to the capacitor C1, a load 112 and the input of a feedback circuit 110 at VOUT. The source of NFET 422 is connected to ground. The output 414 of the feedback circuit 110 is connected to an input of op-amp 102 and an input of op-amp 402.

A DC voltage reference VREF1 is connected to an input of op-amp 102 and DC voltage reference VREF2 is connected to an input of op-amp 402. The output of op-amp 102 is connected to an input 416 of a PWM control logic circuit 104. Clock signal CK is connected to an input of the PWM control logic circuit 104. The output S1 of the PWM control logic circuit 104 controls the switching of NFET 106. The output of op-amp 402 is connected to an input 420 of a PWM control logic circuit 404. Clock signal CK is connected to an input of the PWM control logic circuit 404. The output S2 of the PWM control logic circuit 404 controls the switching of NFET 422.

When the gate of NFET 106 is at a logical high value, current I1 is conducted through the NFET 106 and the inductor L1 into the capacitor C1. Because the NFET 422 is usually not conducting during the time that NFET 106 is conducting, most of the current I1 is conducted through inductor L1 into capacitor C1. As a result, the current I1 is approximately equal to the current IL during this time. When the gate of NFET 422 is at a logical high value, current I2 is conducted from C1 through L1 and NFET 422. Because the NFET 106 is usually not conducting during the time that NFET 422 is conducting, most of the current I2 is conducted from capacitor C1 through inductor L1 and NFET 422. As a result, the current I2 is approximately equal to the current IL during this time.

The output 414 of feedback circuit 110 in this example provides a signal to op-amp 102 and op-amp 402. The signal fed back to op-amp 102 and op-amp 402 is proportional to the voltage on the VOUT. When the voltage on VOUT is below the predetermined value, PWM control logic circuit 104 and PWM control logic circuit 404 change signals S1 and S2 so that on average, more current is being provided to the capacitor C1 than is being drawn from capacitor C1. For example, by changing the duty cycle D1 of signal S1 to a higher value than the duty cycle D2 of signal S2, the DC voltage on VOUT on average will continue to increase until the predetermined value is obtained.

When the predetermined value is reached, the average current I1 supplied by NFET 106 to the capacitor C1 and the average current I2 drawn from the capacitor C1 through NFET 404 are changed appropriately to maintain the predetermined voltage on VOUT. The PWM control logic circuits 104 and 404 continually change their duty cycle D1 and D2 respectively to maintain the DC voltage on VOUT at a substantially constant value.

The synchronous DC-DC step-down switching converter 400 may be very efficient (95% in some cases). As a result, a synchronous DC-DC step-down switching converter is often used in devices where efficiency is important.

Often, before a synchronous DC-DC step-down switching converter 400 is initialized, a positive voltage may be applied to VOUT. VOUT may then be charged to the positive voltage by a circuit that is not part of a synchronous DC-DC step-down switching converter 400. When VOUT has a positive voltage on it before the synchronous DC-DC step-down switching converter 400 is initialized, the VOUT is said to be "pre-biased". When the synchronous DC-DC step-down switching converter 400 is initialized with VOUT pre-biased, the positive voltage on VOUT may drop in voltage for a short time. The drop in voltage that occurs during the initialization of the synchronous DC-DC step-down switching converter 400 is often called a negative-going "glitch". A negative-going glitch may cause problems with a circuit that is connected to VOUT. For example, a negative-going glitch may cause a logic circuit to output an improper logic value.

Figure 6:
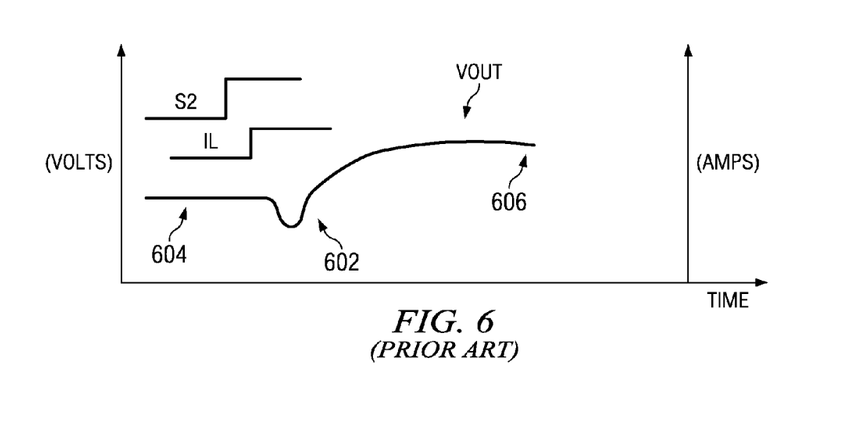
FIG. 6 is a timing diagram illustrating a drop in voltage on a pre-biased output of a synchronous DC-DC step-down switching converter.

FIG. 6 illustrates an example of a negative-going glitch 602 on a pre-biased 604 output of a synchronous DC-DC step-down switching converter. When the signal S2 goes positive, current I2 is drawn through NFET 422. Because NFET 106 is off, the current IL drawn through the inductor L1 is approximately the same as the current I2 drawn through NFET 422. After current IL is drawn through inductor L1, the pre-biased voltage 604 on VOUT drops lower for a short time. After a negative-going glitch 602 occurs, the voltage VOUT begins to increase toward its predetermined value 606.

Figure 7:
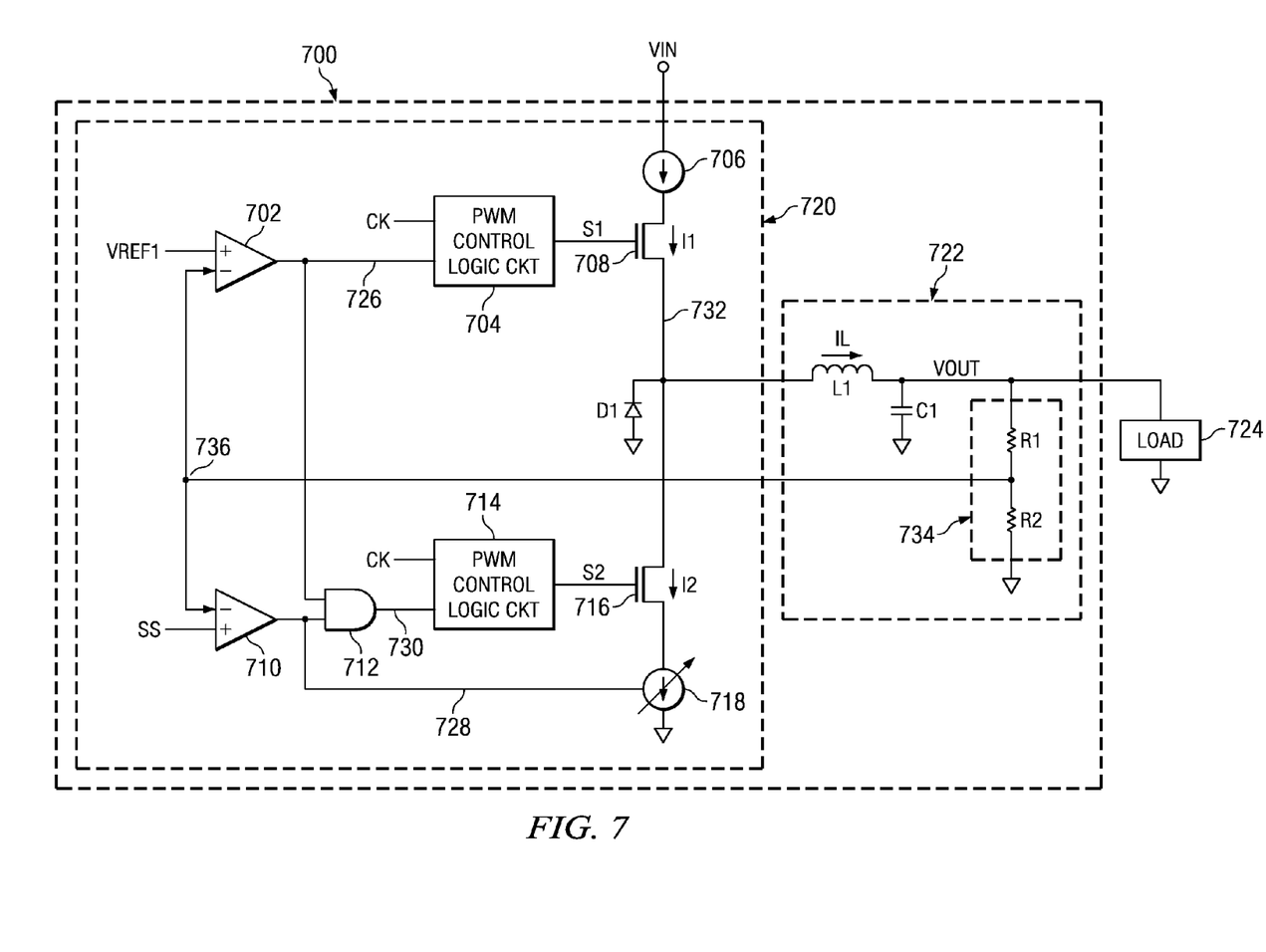
FIG. 7 is an embodiment of a DC-DC step-down switching converter that reduces a drop in voltage on a pre-biased output of the DC-DC step-down switching converter.

FIG. 7 is a schematic of an embodiment of a DC-DC step-down switching converter 700 that reduces a drop in voltage on a pre-biased output of the DC-DC step-down switching converter 700. In this schematic, the frequency at which switches NFETs 708 and 716 switch is controlled by signals S1 and S2 respectively as shown in FIG. 5. Other switches such as MOSFETs (Metal Oxide Semiconductor Field-Effect Transistor), JFETs (Junction Field-Effect Transistor) and bipolar transistors may be used. The signals S1 and S2 shown in FIG. 5 are pulse-width modulated (PWM) signals.

The amount of time, D1*T, that NFET 708 conducts current during a period T is determined by a duty cycle D1 (FIG. 5). The duty cycle D1 may have a value from 0 to 1. The amount of time the NFET 708 does not conduct current is approximately (1−D1)*T. The amount of time, D2*T, that NFET 716 conducts current during a period T is determined by a duty cycle D2 (FIG. 5). The duty cycle D2 may have a value from 0 to 1. The amount of time the NFET 716 does not conduct current is approximately (1−D2)*T. In this example, the time that both NFET 708 and NFET 716 are conducting current at the same time is approximately zero.

In this embodiment of a DC-DC step-down switching converter 700, a voltage VIN is connected to a terminal of current source 706. The drain of NFET 706 is connected to another terminal of current source 706. The current source 706 in this embodiment has a predetermined maximum current limit. The source 732 of NFET 706 is connected to inductor L1, the drain of NFET 716 and the cathode of diode D1. The inductor L1 is also connected to the capacitor C1, a load 724 and the input of a feedback circuit 734 at VOUT. The source of NFET 716 is connected to a terminal of a variable current source 718 and another terminal of the variable current source is connected to ground. The variable current source 718 in this embodiment has a predetermined maximum current limit. In one embodiment of the invention, the predetermined maximum current limit of the variable current source 718 is determined by the value of inductor L1 and the duty cycle of clock signal CK. The output 736 of the feedback circuit 734 is connected to an input of op-amp 702 and an input of op-amp 710.

FIG. 3 is a schematic of an embodiment of a feedback circuit 734. In this example, two resistors R1 and R2 are connected in series. R1 is connected to node 304 and node 302. R2 is connected to node 302 and ground. Node 304 is connected to the input VOUT of the feedback circuit 734 and node 302 is connected to the output 736 of the feedback circuit 734. Other embodiments of a feedback circuit 734 may be used in the DC-DC step-down switching converter 700 shown in FIG. 7.

A DC voltage reference VREF is connected to an input of op-amp 702 and a soft-start variable voltage SS is connected to an input of op-amp 710. The output of op-amp 702 is connected to an input 726 of a PWM control logic circuit 704 and an input of the two-input AND gate 712. Clock signal CK is connected to an input of the PWM control logic circuit 704. The output S1 of the PWM control logic circuit 704 controls the switching of NFET 708. The output of op-amp 710 is connected to an input 728 of the variable current source 718 and to an input of the two-input AND gate 712. Clock signal CK is connected to an input of the PWM control logic circuit 714. The output 738 of the two-input AND gate 712 is connected to an input of the PWM control logic circuit 714. The output S2 of the PWM control logic circuit 404 controls the switching of NFET 716.

In an embodiment of the invention, the switch NFET 708, the switch NFET 716, the first op-amp 702, the second op-amp 710, the first PWM control logic circuit 704, the second control logic circuit 714, the AND gate 712, and the diode D1 are located on a single integrated circuit 720. In an embodiment of the invention, the inductor L1 and the capacitor C1 are discrete devices and are located externally to an integrated circuit 720.

When the gate of NFET 708 is at a logical high value, current I1 is conducted through the NFET 708 and the inductor L1 into the capacitor C1. Because the NFET 716 is usually not conducting during the time that NFET 708 is conducting, most of the current I1 is conducted through inductor L1 into capacitor C1. As a result, the current I1 is approximately equal to the current IL during this time. When the gate of NFET 716 is at a logical high value, current I2 is conducted from C1 through L1 and NFET 716. Because the NFET 708 is usually not conducting during the time that NFET 716 is conducting, most of the current I2 is conducted from capacitor C1 through inductor L1 and NFET 716. As a result, the current I2 is approximately equal to the current IL during this time.

In an embodiment of the invention, with a pre-biased voltage 802 (see FIG. 8) on VOUT, the voltage VIN (see FIG. 8) changes from approximately zero volts to a positive voltage. Some time shortly after VIN becomes a positive value, the voltage SS begins to increase in value from approximately zero volts. At this time, the voltage 736 fed back to op-amp 702 is lower than the voltage reference VREF. Because the voltage 736 fed back to op-amp 702 is lower than the voltage reference VREF, the output 726 of op-amp 702 is a logical high value. Because the output 726 of op-amp 702 is a logical high value, S1 begins to switch NFET 708 and current I1 flows through NFET 708 through inductor L1 into capacitor C1. In this example, the current I1 is approximately equal to the current IL flowing through inductor L1 into capacitor C1.

Also during this time, the voltage 736 fed back to op-amp 710 is higher than the voltage SS. Because the voltage 736 fed back to op-amp 710 is higher than the voltage SS, the output 728 of op-amp 710 is a logical low value. Because the output 728 of op-amp 710 is a logical low value, the output of the two-input AND gate 712 is also a logical low value. Because the output of the two-input AND gate 712 is a logical low value, S2 remains at a low voltage and the NFET 716 remains off. Because NFET 716 remains off, approximately no current is drawn through NFET 716.

In this embodiment, the state where NFET 708 is switching and NFET 716 is off, the voltage VOUT on capacitor C1 is increasing in voltage with no drop in voltage from the pre-biased voltage. This state is called the non-synchronous rectified mode.

When the voltage on SS has increased to a voltage greater than the voltage on the output 736 of the feedback circuit 734, the output 728 of op-amp 710 changes to a positive logical value. When the output 728 of op-amp 710 changes to a positive logical value, the time period T1 begins. At the beginning of time period T1, the logical values of the outputs 726 and 728 of op-amps 702 and 710 respectively are high values. Because the outputs 726 and 728 are high values, the output 730 of the two-input AND gate 712 changes to a logical high value. Because the output 730 is a high logical value, S2 begins to switch and current I2 is drawn through NFET 716.

Figure 8:
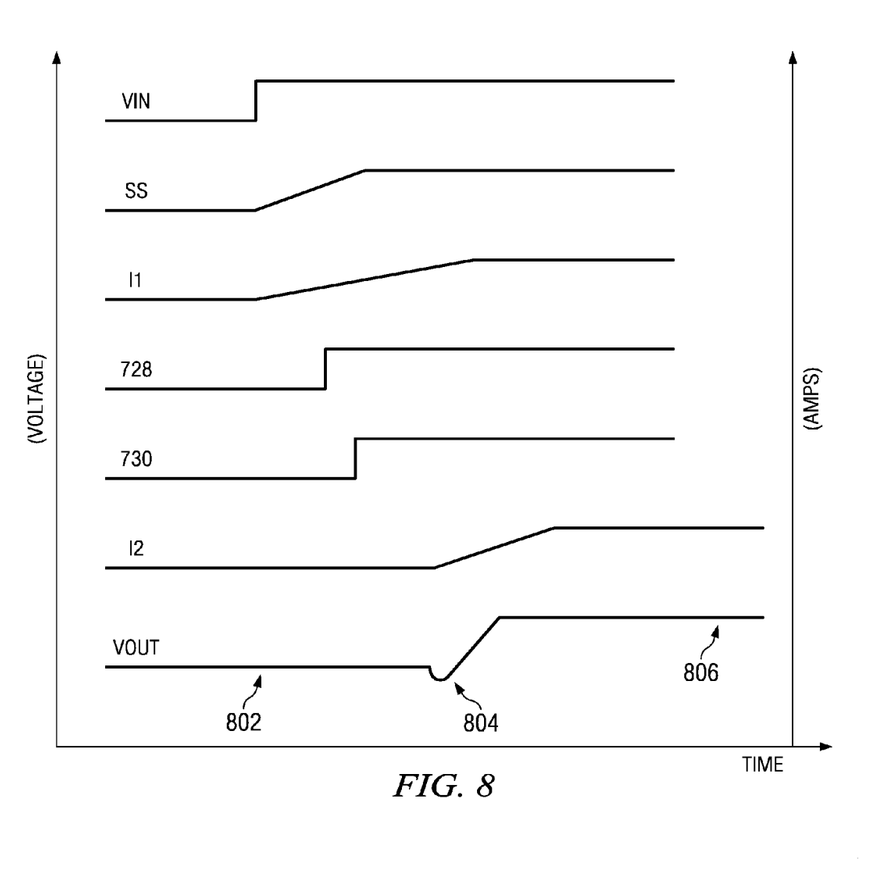
FIG. 8 is a timing diagram illustrating a reduction in the drop in voltage on a pre-biased output of an embodiment of a DC-DC step-down switching converter.

When NFET 716 begins to draw current I2, the current I2 is controlled such that the magnitude I2 is less than the magnitude of the current I1 drawn through NFET 708. This condition remains the same until the voltage on the output 736 of the feedback circuit 734 is greater than the voltage VREF. The time period T1 also ends when the voltage on the output 736 of the feedback circuit 734 is greater than the voltage VREF. During the time period T1, the current IL through the inductor L1 remains positive. Because the current IL remains positive for at least a portion of the time period T1, a drop in voltage 804 on VOUT is greatly reduced.

In this embodiment of the invention, after VOUT reaches a predetermined value 806, the DC-DC step-down switching converter 700 operates in a synchronous mode where both NFETs 708 and 716 are active. In this example, the time that both NFET 708 and NFET 716 are conducting current at the same time is approximately zero.

Figure 9:
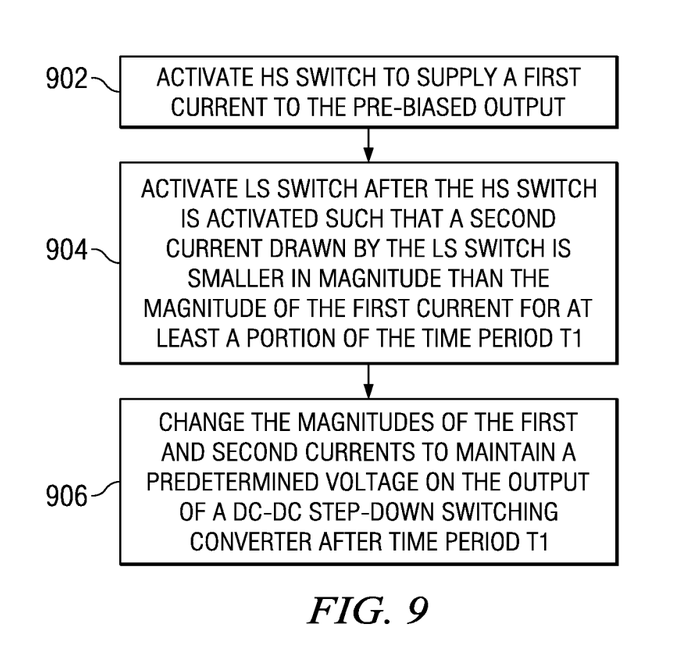
FIG. 9 is a flow chart illustrating an embodiment of a method for reducing a drop in voltage on a pre-biased output of an embodiment of a DC-DC step-down switching converter.

FIG. 9 is a flow chart illustrating an embodiment of a method for reducing a drop in voltage on the pre-biased output of an embodiment of a DC-DC step-down switching converter. During step 902, a HS (high side) switch is activated to supply a first current to the pre-biased output of the DC-DC step-down switching converter. After the HS switch is activated, a LS (low side) switch is activated and draws a second current for a time period T1, step 904. During at least a portion of the time period T1, the magnitude of the first current is greater than the magnitude of the second current. At the end of the time period T1, step 906 occurs. During step 906, the magnitudes of the first and second currents are changed to maintain a pre-determined voltage on the output of the DC-DC step-down switching converter.

A DC-DC step-down switching converter 700 may be incorporated into electronic devices such as a personal digital assistant, a mobile phone, a portable device, a handheld device, a personal computer, a notebook computer, a camera, an electronic game, a vending machine and an industrial machine.

The foregoing description has been presented for purposes of illustration and description. It is not intended to be exhaustive or to limit the invention to the precise form disclosed, and other modifications and variations may be possible in light of the above teachings. The embodiments were chosen and described in order to best explain the applicable principles and their practical application to thereby enable others skilled in the art to best utilize various embodiments and various modifications as are suited to the particular use contemplated. It is intended that the appended claims be construed to include other alternative embodiments except insofar as limited by the prior art.

What is claimed is:

1. A method of reducing a drop in voltage on a pre-biased output of a DC-DC step-down switching converter comprising:
   applying a pre—bias voltage to the output of the DC—DC step—down converter before activating the converter;
   activating a HS switch, the HS switch conducting a first current to the pre-biased output;
   activating a LS switch after the HS switch is activated, the LS switch drawing a second current from the pre-biased output wherein the second current is smaller in magnitude than the first current for at least a portion of a time period T1,
   changing the magnitudes of the first and second currents to maintain the predetermined voltage on the pre-biased output of the DC-DC step-down switching converter after the time period T1, wherein the second current drawn through the LS switch is controlled by the clock signal, a variable voltage reference and the feedback signal from the pre-biased output of the DC-DC step-down switching converter;
   delaying activating the LS switch until after the feedback signal exceeds the variable voltage reference whereby droop in output voltage is reduced, wherein the first current conducted through the HS switch is controlled by a clock signal, a fixed voltage reference, and a feedback signal from the pre-biased output of the DC-DC step-down switching converter.

2. The method of claim 1, wherein the clock signal is a pulse-width modulated signal.

3. A DC-DC step-down switching converter comprising:
   a HS switch having a control node, an input connected to a first terminal of a current source and an output connected to a first terminal of an inductor,
   a second terminal of the inductor being connected to an output of the DC-DC step-down converter and a first terminal of a capacitor,
   a second terminal of the capacitor being grounded;
   wherein a DC voltage is connectable to a second terminal of the current source;
   wherein a cathode of a diode is connected to the first terminal of the inductor and an anode of the diode is connected to ground;
   wherein the HS switch conducts a first current to the output, the first current being controlled by a first signal on the control node of the HS switch;
   a LS switch having a control node, an input connected to the first terminal of a variable current source and an output connected to the first terminal of the inductor, wherein the LS switch conducts a second current from the output after the HS switch stops conducting the first current;
   wherein the second current is controlled by a second signal on the control node of the LS switch by a soft start circuit for allowing the DC—DC converter to start up with a pre—bias voltage applied to the output, activation of the low side switch being delayed until a feedback signal from an output voltage of the converter exceeds a voltage of the soft start circuit whereby droop in the output voltage is reduced, and
   wherein a magnitude of the first current is larger than a magnitude of the second current for at least a portion of the time period T1;
   wherein the magnitudes of the first and second currents are changed to maintain a predetermined voltage on the pre-biased output of the DC-DC step-down switching converter after the time period T1;
   wherein the first current conducted through the HS switch is controlled by a clock signal, a fixed voltage reference, and a feedback signal from the pre-biased output of the DC-DC step-down switching converter.

4. The DC-DC step-down switching converter of claim 3 wherein the HS switch and the LS switch are selected from a group consisting of a MOSFET, a JFET and a bipolar transistor.

5. The DC-DC step-down switching converter of claim 3 wherein the apparatus further comprises:
   a first op-amp having a first input connected to a first voltage reference, a second input and an output;
   a first PWM control logic circuit having a first input connected to a clock signal, a second input connected to the output of the first op-amp and an output connected to the control node of the HS switch;
   a second op-amp having a first input connected to a first variable voltage reference, a second input and an output;
   an AND gate having a first input connected to the output of the first op-amp, a second input connected to the output of the second op-amp and an output;
   a second PWM control logic circuit having a first input connected to the clock signal, a second input connected to the output of the AND gate and an output connected to the control node of the LS switch;

a feedback circuit with an input connected to the pre-biased output and an output connected to the second input of the first op-amp and the second input of the second op-amp;
wherein the output of the second op-amp controls the variable current source.

6. The DC-DC step-down switching converter of claim 5 wherein the feedback circuit comprises:
a first resistor having a first terminal connected to the pre-bias output and a second terminal connected to the output of the feedback circuit;
a second resistor having a first terminal connected to the output of the feedback circuit and a second terminal connected to ground.

7. The DC-DC step-down switching converter of claim 5 wherein the first variable voltage reference begins increasing its voltage from approximately zero volts after the DC voltage is applied to the input of the current source.

8. The DC-DC step-down switching converter of claim 5 wherein the time period T1 begins when the voltage on the first input of the second op-amp is greater than the voltage on the second input of the second op-amp.

9. The DC-DC step-down switching converter of claim 5 wherein the time period T1 ends when the voltage on the second input of the first op-amp is greater than the first voltage reference.

10. The DC-DC step-down switching converter of claim 5 wherein the first current has a first predetermined maximum current limit.

11. The DC-DC step-down switching converter of claim 5 wherein the second current has a second predetermined maximum current limit.

12. The DC-DC step-down switching converter of claim 5 wherein the capacitor and the inductor are discrete external components.

13. The DC-DC step-down switching converter of claim 5 wherein the HS switch, the LS switch, the first op-amp, the second op-amp, the first PWM control logic circuit, the second PWM control logic circuit, the AND gate, and the diode are located on an integrated circuit.

14. The DC-DC step-down switching converter of claim 3 wherein the apparatus is incorporated into an electronic device selected from the group consisting of a personal digital assistant, a mobile phone, a portable device, a handheld device, a personal computer, a notebook computer, a camera, an electronic game, a vending machine and an industrial machine.

15. In a DC-DC step-down switching converter, a start up circuit comprising:
a first control circuit for a HS switch wherein the HS switch conducts a first current to an output couplable to a source of pre-bias voltage;
a second control circuit for a LS switch wherein the LS switch conducts a second current from the output for a period T1 after the HS switch begins conducting the first current;
a soft start circuit coupled to the second control circuit for controlling the LS switch for delaying activation of the LS switch until a feedback signal exceeds a variable voltage reference whereby droop in an output voltage is reduced;
wherein the magnitudes of the first and second currents are changed to maintain a predetermined voltage on the pre-biased output of the DC-DC step-down switching converter after the time period T1;
wherein the first current conducted through the HS switch is controlled by a clock signal, a fixed voltage reference, and a feedback signal from the pre-biased output;
wherein the second current conducted through the LS switch is controlled by the clock signal, a variable voltage reference and the feedback signal from the pre-biased output.

* * * * *